United States Patent [19]

Reid et al.

[11] 4,031,238
[45] June 21, 1977

[54] PROCESS FOR PREPARING INSTANT BEVERAGE CUBES

[75] Inventors: Joanne Reid, Boston, Mass.; Elpidio Leoncio de la Teja, Hackensack; Francis Farrell, Madison, both of N.J.

[73] Assignee: Thomas J. Lipton, Inc., Englewood Cliffs, N.J.

[22] Filed: May 30, 1975

[21] Appl. No.: 582,391

[52] U.S. Cl. .............................. 426/285; 426/590; 426/593; 426/594; 426/597; 426/658; 426/454

[51] Int. Cl.² ...................... A23L 2/38; A23F 3/00

[58] Field of Search .......... 426/285, 590, 593, 594, 426/596, 597, 453, 658, 454

[56] References Cited

UNITED STATES PATENTS

| | | | |
|---|---|---|---|
| 3,121,635 | 2/1964 | Eldred | 426/242 |
| 3,227,558 | 1/1966 | Richmond | 426/285 |
| 3,424,589 | 1/1969 | Kan et al. | 426/453 |
| 3,666,483 | 5/1972 | Tessmar | 426/335 |
| 3,767,419 | 10/1973 | Sienkiewicz et al. | 426/595 |
| 3,772,037 | 11/1973 | Meyer et al. | 426/453 |
| 3,779,772 | 12/1973 | Forkner | 426/285 |
| 3,920,854 | 11/1975 | Wuhrmann et al. | 426/590 X |

FOREIGN PATENTS OR APPLICATIONS

| | | | |
|---|---|---|---|
| 732,559 | 4/1966 | Canada | 426/453 |
| 2,160 | 8/1870 | United Kingdom | 426/453 |

*Primary Examiner*—Raymond N. Jones
*Assistant Examiner*—Esther L. Massung
*Attorney, Agent, or Firm*—Brumbaugh, Graves, Donohue & Raymond

[57] ABSTRACT

A water-soluble solid beverage cube, consisting of powdered glucose monohydrate, sucrose and hygroscopic flavor material, is prepared by mixing the ingredients, heating them above 95° F in a high humidity atmosphere, shaping the solidified mass and allowing the solid to cool. Additives may be added to the powdered mixture to increase the strength of the solid, improve its hygroscopic nature and alter its taste.

6 Claims, 1 Drawing Figure

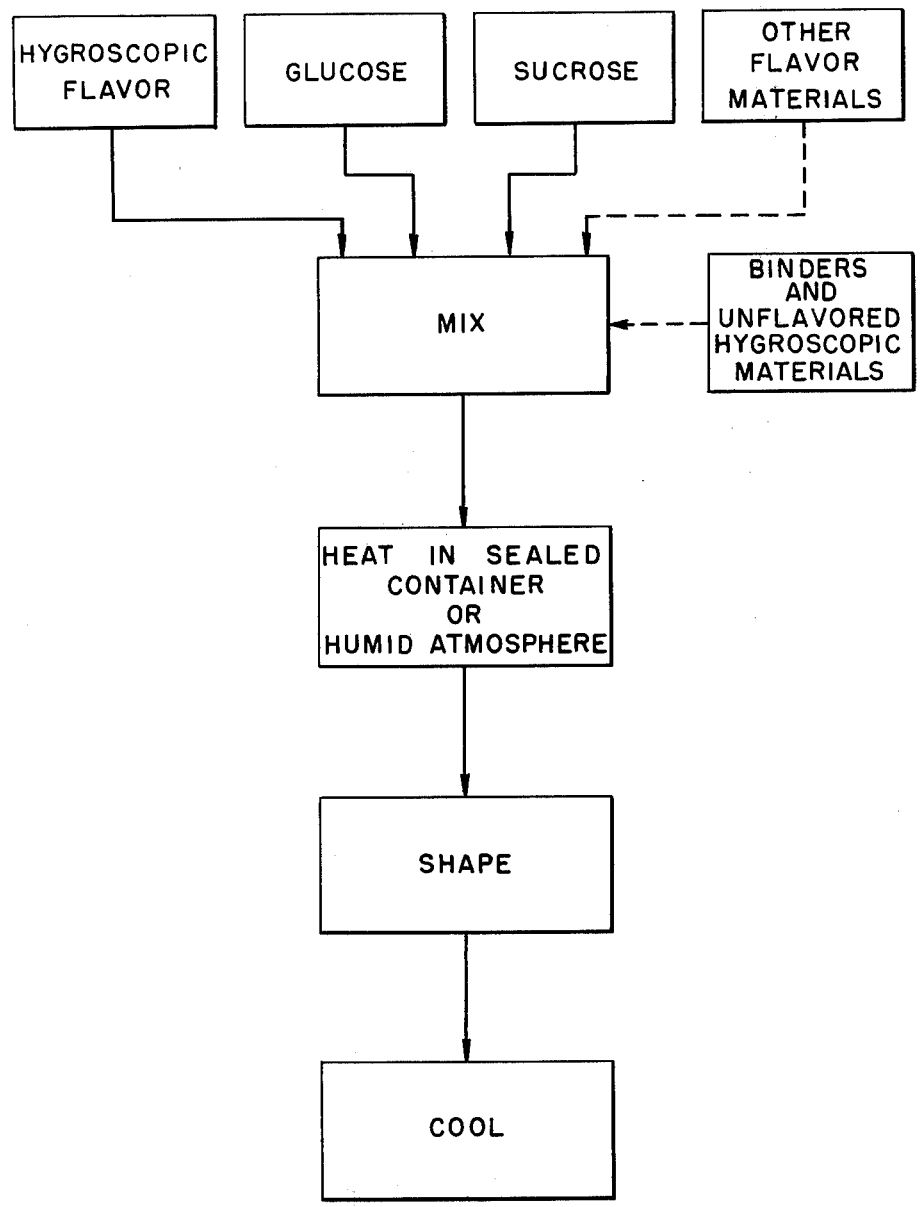

PROCESS FOR PREPARING INSTANT BEVERAGE CUBES

BACKGROUND OF THE INVENTION

This invention relates to dry water-soluble beverage materials and, more particularly, to water-soluble instant lemon flavored tea cubes.

A number of processes have been developed for producing "instant coffee," "instant tea" or other dry substances that will dissolve in water to form a desired beverage. Generally, these processes form either granular agglomerates or tablets of the dry beverage substance. The agglomerates are formed by first blending a dry integrated beverage material from substances such as instant coffee, sugar and powdered milk. The material is then ground to a fine particle size, moistened, agitated and dried to form the granular agglomerate. The tablets or cubes, which are usually sufficient to make one cup of the beverage, are formed by combining the flavor material (e.g. coffee or tea) with a binder material (e.g. fat and an emulsifier) and forming the combination into the desired shape. When such a beverage tablet is dissolved in water, the binder must not affect the taste or appearance of the resulting beverage. When fat and an emulsifier are used as the binder, the emulsifier must disperse the fat so that no droplets of fat are visible on the surface of the beverage.

Alternatively, a beverage cube can be made by combining the flavor material with a vehicle (such as ethyl alcohol) and water to form a damp, but non-cohesive powder. Then the damp powder is formed into a cube under pressure and dried to evaporate the vehicle.

The agglomerates formed by previous methods are unsatisfactory because it is difficult to measure out the proper amount when the beverage is made. Also, they are inconvenient to store. The cubes or tablets formed by prior methods also have disadvantages in that the binder or vehicle is never completely eliminated from the beverage and may affect its taste and appearance.

SUMMARY OF THE INVENTION

The present invention is directed to providing a beverage cube without the use of conventional binders or vehicles by using a hygroscopic flavor material and sugar as the basic ingredients. Since conventional binders or vehicles are not used, the resulting product has an improved taste and appearance.

In an illustrative embodiment of the invention an instant tea cube is made by mixing together 33% powdered glucose monohydrate, 62% granular sucrose and 5% powdered hygroscopic tea and lemon flavor to form a powdered mixture. The mixture is then heated in a sealed chamber above 95° F to solidify the mixture. After the solid is formed it is cut into the desired cube or tablet shape and is cooled under atmospheric conditions. When desired, other hygroscopic or nonhygroscopic flavor materials may be added to the basic material to suit individual tastes. Also, minor amounts of binder materials and unflavored hygroscopic materials may be included in the mixture to aid the process.

BRIEF DESCRIPTION OF THE DRAWING

The foregoing and other features of the present invention will be more readily apparent from the following detailed description and drawing of a flow diagram showing the various steps in the formation of the beverage tablet of the present invention.

DESCRIPTION OF EXEMPLARY EMBODIMENTS

The drawing illustrates a process for making beverage cubes or tablets that are sweetened and flavored, and which readily dissolve in water. The tablets are easy to handle and are formulated so that one or two of the tablets will produce the desired concentration of beverage when dissolved in an appropriate amount of hot or cold water.

The process for manufacturing the cubes involves mixing one part powdered glucose (dextrose) monohydrate with about two parts granular sucrose, plus a small amount of hygroscopic flavor material, such as powdered instant tea with or without lemon flavoring. The tea flavoring can be pure instant tea mix, with or without dextrin. After blending the powders, the mixture is spread on a forming tray or a conveyor belt. The mixture is then heated to more than 95° F in a closed chamber. The maximum temperature that can be used will depend on the sugar and flavor materials and should be low enough so that the flavor is not driven out of the material and the sugar is not melted. Heating of the material continues until the powdered mixture solidifies into a mass. The mass is then cut or shaped into the desired shape for the cubes or tablets. The shaping operation is usually performed after the cubes have cooled, but they can be cut while still hot. Finally, the cubes are allowed to dry under atmospheric conditions. This natural drying prevents the tablets from becoming friable.

As an alternative to heating the mixture in a sealed chamber, it can be heated in an atmosphere with more than 70% relative humidity. Also, the mixture can be placed in small molds so that the tablets will solidify in the proper shape and the cutting and shaping step can be eliminated.

The reaction by which the powdered mixture is converted into a solid is believed to involve the release of water by the glucose monohydrate. When the glucose is heated above 95° F in a closed container the release of the water generates a high humidity condition. Since the hygroscopic flavor material has been intimately mixed with the glucose, the flavor will absorb the moisture under the prescribed temperature and humidity conditions. These wetted particles fully or partially wet adjacent sugar particles causing partial or complete dissolution of them. In effect, the flavor material acts as a binding agent for the entire system to form a solidified mass.

In forming the powdered mixture, small amounts of secondary hygroscopic agents (e.g. silica gel, $Al_2O_3$, $Na_2HPO_4$, $MgSO_4$, etc.) may be needed to aid in retaining the moisture in the solid once it is formed. However, the concentration of these materials should generally be kept below 1/2%. Also, binding agents may be added to give greater mechanical strength to the cubes in order to reduce breakage during shipping and handling. It has been found, however, that the cubes usually have sufficient strength without the addition of binders. Secondary flavor materials, which need not be hygroscopic, may also be added to the mixture to vary its taste.

It has been found that satisfactory results can be obtained if the powdered mixture comprises 16 to 40% glucose monohydrate, 50 to 79% sucrose, adjusted to give a total sugar content of between 90 and 95%, and 1 to 10% hygroscopic flavor material.

The invention may be illustrated by reference to the following example.

EXAMPLE

A mixture was prepared from 32.9% powdered glucose monohydrate, 61.76% granular sucrose, 2.5% hygroscopic instant tea mix and a remainder of lemon flavor ingredients. The tea particles were smaller than 60 mesh, the lemon particles were less than 30 mesh and the sugar was normal granulated particles ranging between 30 and 100 mesh. The mixture was heated for one hour in a forming tray at 100° F in a closed chamber. The resulting solid was cut into cubes and allowed to dry under atmospheric conditions. Beverage cubes formed by this process are easily dissolved in cold water to produce a sweetened lemon flavored ice tea beverage. Also, the cubes are strong and resisted breakage, even with rough handling.

While the invention has been particularly shown and described with reference to preferred embodiments thereof, it will be understood by those skilled in the art that various changes in form and details may be made therein without departing from the spirit and scope of the invention. In particular, artificial sweeteners can be substituted for some of the sugar if bulking agents are used. Also, hygroscopic flavoring materials other than tea can be used (e.g., coffee, cocoa, etc.).

We claim:

1. A method of manufacturing a water-soluble solid beverage tablet comprising the steps of:
    forming a mixture consisting essentially of 16 to 40% powdered glucose monohydrate, 50 to 70% granular sucrose and 1 to 10% powdered hygroscopic flavor material, the sucrose being adjusted to give a total sugar content of between 90 and 95%;
    heating the mixture above 95° F in a sealed chamber until the mixture binds into a mass;
    forming the mass into predetermined tablet shapes; and
    cooling the tablets.

2. The method of claim 1 in which the step of cooling the tablets is performed by allowing the tablets to cool under atmospheric conditions.

3. The method of claim 1 in which said hygroscopic flavor material is a tea flavored material.

4. The method of claim 1 in which said mixture further includes secondary hygroscopic material.

5. The method of claim 1 in which said mixture further includes non-hygroscopic flavor material.

6. The method of claim 1 in which the step of forming the solid is performed by placing the powdered mixture in molds so that it solidifies directly into tablets.

* * * * *